US008261459B2

(12) United States Patent
Cooper et al.

(10) Patent No.: US 8,261,459 B2
(45) Date of Patent: *Sep. 11, 2012

(54) EXTENDABLE EDGE REFERENCE TOOL

(75) Inventors: Edward Cooper, Lafayette, CA (US);
Jeff Hayashida, San Jose, CA (US);
Andrew Butler, Palo Alto, CA (US);
David Titzler, Palo Alto, CA (US);
Brian Lamb, San Francisco, CA (US);
John Johnston, Redwood City, CA
(US); Christopher Tacklind, Palo Alto,
CA (US)

(73) Assignee: D2M International PTY Ltd., Hong Kong (HK)

( * ) Notice: Subject to any disclaimer, the term of this patent is extended or adjusted under 35 U.S.C. 154(b) by 35 days.

This patent is subject to a terminal disclaimer.

(21) Appl. No.: 12/897,763

(22) Filed: Oct. 4, 2010

(65) Prior Publication Data

US 2011/0016735 A1 Jan. 27, 2011

Related U.S. Application Data

(63) Continuation of application No. 11/556,569, filed on Nov. 3, 2006, now Pat. No. 7,805,850.

(60) Provisional application No. 60/733,897, filed on Nov. 4, 2005.

(51) Int. Cl.
*B43L 7/10* (2006.01)

(52) U.S. Cl. ............... 33/374; 33/376; 33/495; 33/499; 33/478

(58) Field of Classification Search ............ 33/374, 33/376, 452, 459, 464, 484, 490, 491, 495–500, 33/809, 478, 465, 469, 474, 475, 458; 403/348–350, 353, 325; 292/113, 247, 248, DIG. 8

See application file for complete search history.

(56) References Cited

U.S. PATENT DOCUMENTS

| 224,401 | A | * | 2/1880 | Derichson | 33/809 |
|---|---|---|---|---|---|
| 747,850 | A | * | 12/1903 | Bihlman | 33/376 |
| 845,291 | A | * | 2/1907 | Breckenridge | 403/321 |
| 958,349 | A | * | 5/1910 | Andersen | 33/374 |
| 1,024,054 | A | * | 4/1912 | Barnes | 292/247 |
| 1,094,651 | A | * | 4/1914 | Hayden | 33/376 |
| 1,132,318 | A | * | 3/1915 | Feder | 403/341 |
| 1,205,946 | A | * | 11/1916 | Lyons | 33/376 |
| 1,261,658 | A | * | 4/1918 | Waller | 33/374 |
| 1,430,904 | A | * | 10/1922 | Hunter | 33/374 |
| 1,462,231 | A | * | 7/1923 | Fouse | 403/102 |
| 1,605,604 | A | * | 11/1926 | Nerbon | 33/376 |
| 1,655,766 | A | * | 1/1928 | Hildebrant | 403/340 |
| 2,879,606 | A | * | 3/1959 | Olivere | 33/374 |
| 5,388,338 | A | | 2/1995 | Majors | |
| 5,433,011 | A | * | 7/1995 | Scarborough et al. | 33/376 |
| 5,819,427 | A | | 10/1998 | Rohweder | |
| 6,560,885 | B1 | * | 5/2003 | Cosentino | 33/374 |
| 6,807,743 | B2 | * | 10/2004 | Odachowski | 33/465 |
| 7,805,850 | B1 | * | 10/2010 | Cooper et al. | 33/374 |
| 2009/0139104 | A1 | * | 6/2009 | Rohweder | 33/478 |

* cited by examiner

*Primary Examiner* — Christopher Fulton
(74) *Attorney, Agent, or Firm* — Jeffrey Schox

(57) ABSTRACT

An extendable edge reference tool is disclosed. A first segment having a extending end and a receptacle end is provided. The receptacle end includes a coupling mechanism for joining a second segment using an over-center locking force to secure said second segment to said first segment. This tool provides for a useful continuous reference edge over extended distances through adjoining segments. Each segment is suitably compact to be easy stowed. The segments are useful individually. The segments can be joined to extend tool to lengths useful in common construction tasks.

20 Claims, 8 Drawing Sheets

EXTENDABLE EDGE REFERENCE TOOL

CROSS REFERENCE TO RELATED APPLICATION

This application is a continuation of application Ser. No. 11/556,569 filed on Nov. 3, 2006 which claims priority to Provisional Application Ser. No. 60/733,897, filed on Nov. 3, 2005.

FIELD OF THE DISCLOSURE

The present disclosure relates generally to measurement tools, and in particular to reference tools.

BACKGROUND

Construction and building tasks often require a suitable reference for establishing flatness, linearity or a common relationship of surface features. As examples among many different applications, a carpenter may use a linear reference tool to establish highpoints while planing a surface, or an installer may use a similar reference to establish low spots while finishing a wall. Typical extending straight edge tools are limited in length or do not create a continuous reference edge, and include a level. Levels are often used due to their straightness and finished edges, but the level function is not critical to many applications and including the level in a straight edge increases the tool cost.

DETAILED DESCRIPTION

Embodiments of the present invention described in the following detailed description are directed at virtual agents. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 7:
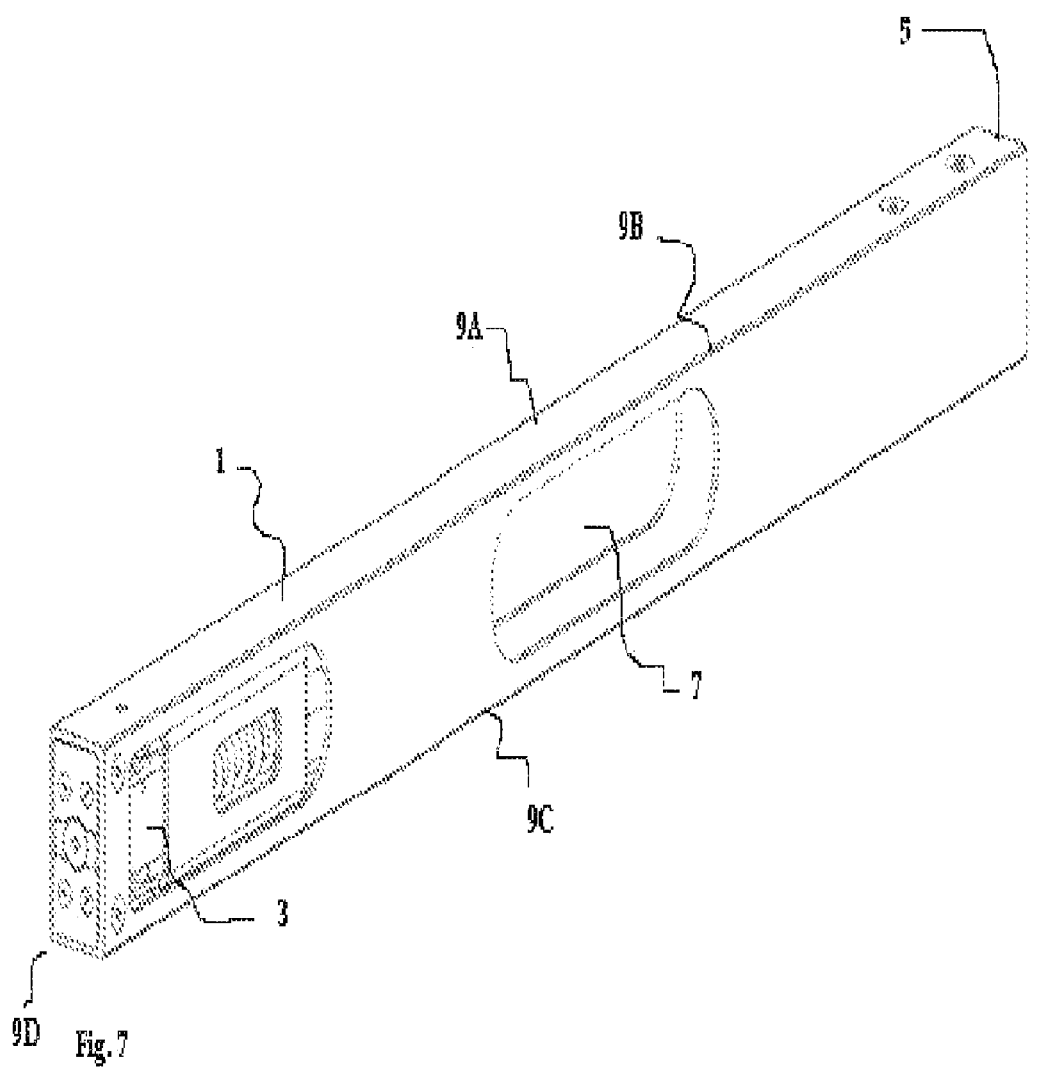
FIG. 7 shows one embodiment of segment assembly in accordance with this disclosure.

FIG. 7 shows an oblique view of one embodiment of an extendable edge reference 1 in accordance with this disclosure. A segment assembly 1 has edges 9A, 9B, 9C and 9D providing a useful linear reference. An extending coupling mechanism 3 is positioned at one end of the segment 1. A receiving feature 5 is positioned at the opposite end of the segment 1. Various features may be disposed in an area 7 for the attachment of accessories. Such features may include, but are not limited to cutouts, as shown, but could include characteristics of segment section profiles, inclusion of fastening elements, or a variety of suitable means. The segment assembly could be a variety of sizes. In a preferred embodiment the segment 1 is by 4' long, with the section common to 2×4 lumber.

Figure 6:
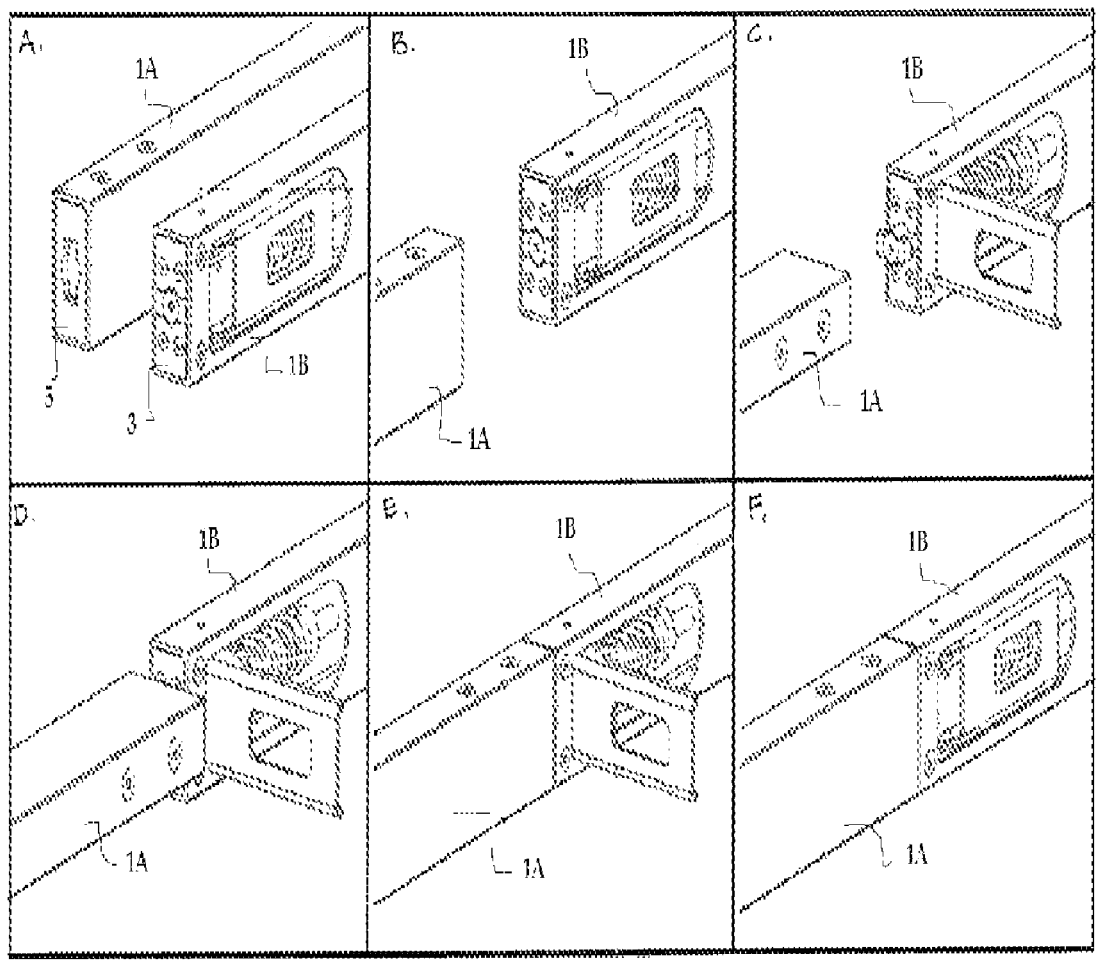
FIG. 6 shows assembly sequence in series of partial oblique views in accordance with this disclosure.

FIG. 6 shows a sequence illustrating one method of attaching two segments as described by this embodiment. Though FIG. 6 illustrates one such joining method, it is contemplated that alternate means and sequences of joining segment assemblies may be employed.

FIG. 6A shows a partial oblique view of two segments, a first segment assembly 1A presenting the receptacle end 5, and a second segment assembly 1B presenting the extending end 3. FIG. 6B shows the two segments 1A, 1B aligned for joining.

FIG. 6C shows the second segment with extending coupling mechanism 3 deployed, and the first segment 1A rotated approximately 90° to align the receiving feature 5 with the T-Head protruding from the segment 1B. FIG. 6D shows the first segment 1A abutted to the second segment 1B.

FIG. 6E shows the first segment 1A rotated to align with the second segment 1B. In this embodiment, this action causes the extending coupling mechanism 3 of segment 1B to engage the receiving feature 5 of segment 1A.

FIG. 6F shows the extending coupling mechanism latched in segment assembly 1B.

Figure 1:
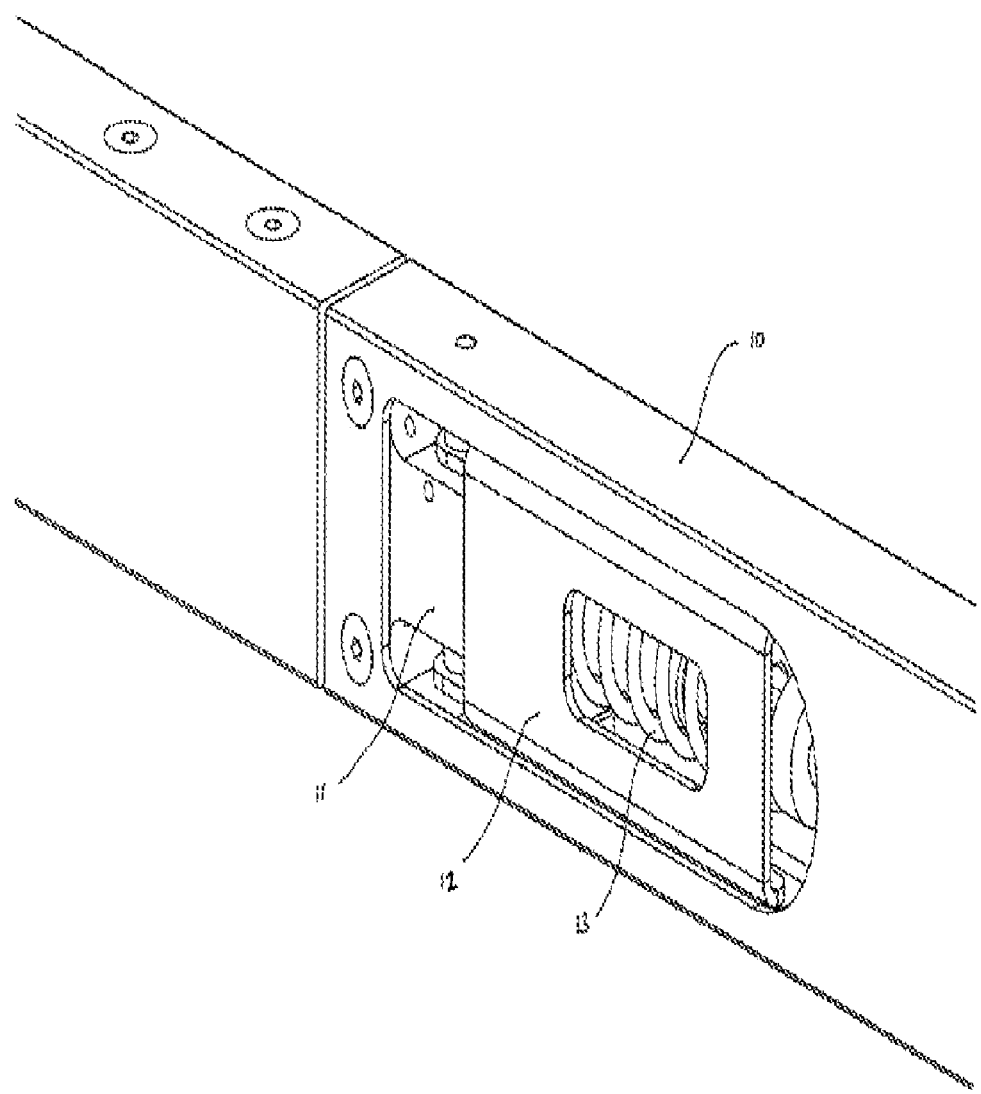
FIG. 1 shows a partial oblique view of two joined segments in accordance with this disclosure.
Figure 2:
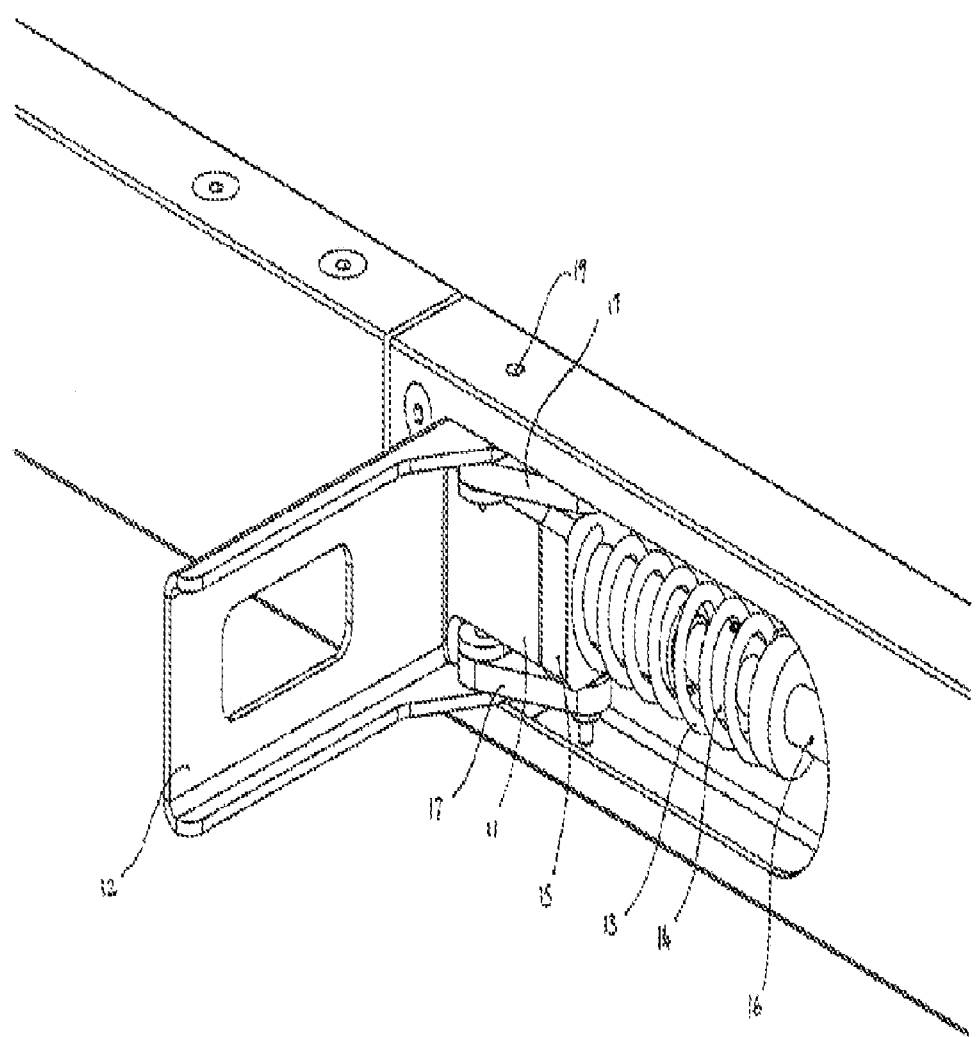
FIG. 2 shows a partial oblique view of two joined segments with handle open showing the clamping mechanism in accordance with this disclosure.
Figure 3:
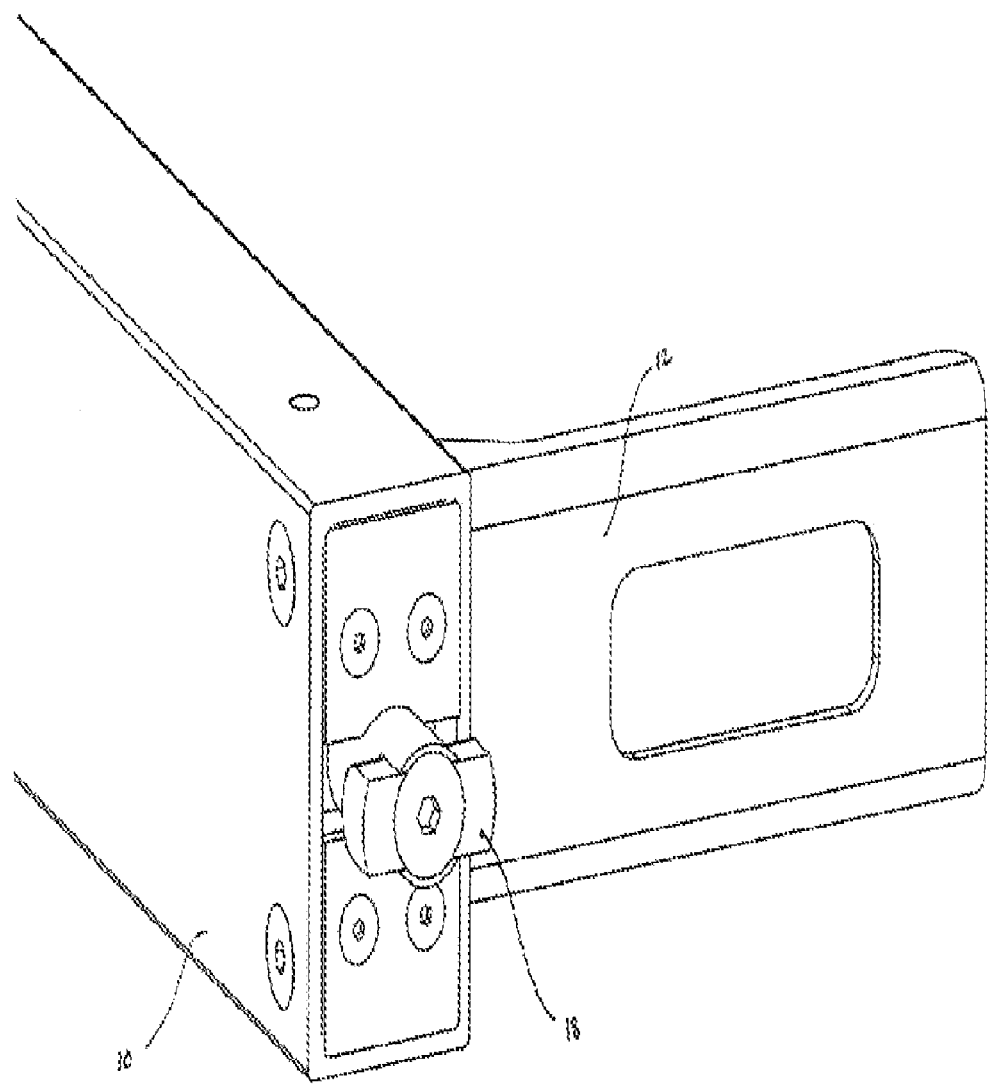
FIG. 3 shows partial oblique view of an extending feature of the joining mechanism in accordance with this disclosure.
Figure 4:
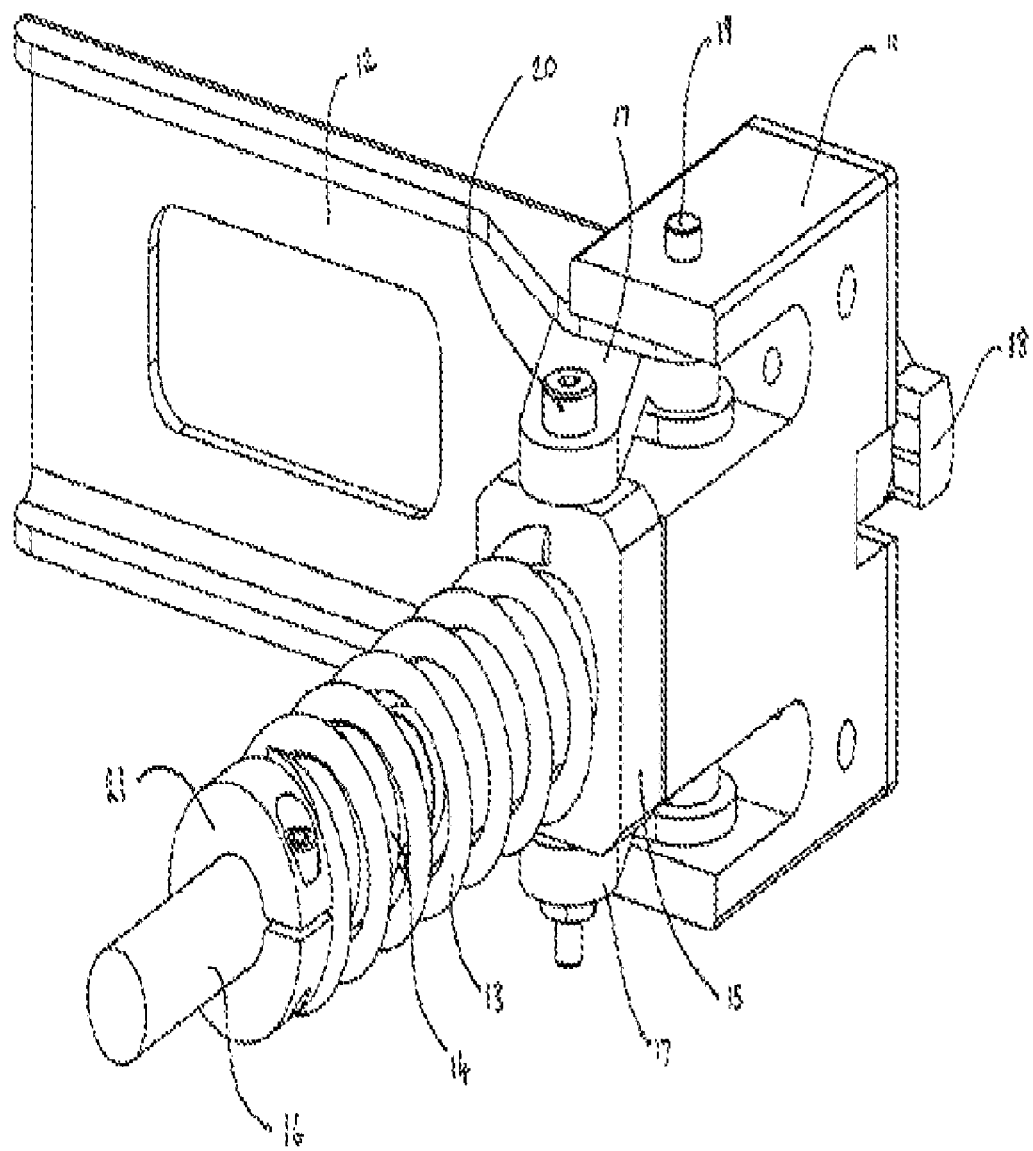
FIG. 4 shows an oblique view of coupling mechanism in accordance with this disclosure.

FIG. 4 is a more detailed view of one embodiment of a joining mechanism in accordance with this disclosure. In FIG. 4, the handle 12 is linked to the plunger shaft 16 through links 17, a slider 15, a spring 13 and a collar 21 such that the T-Head 18 mounted on the end of the plunger shaft 16 extends when the handle 12 is opened as shown in FIG. 3, and retracts when the handle 12 is closed as shown in FIG. 1.

Figure 5:
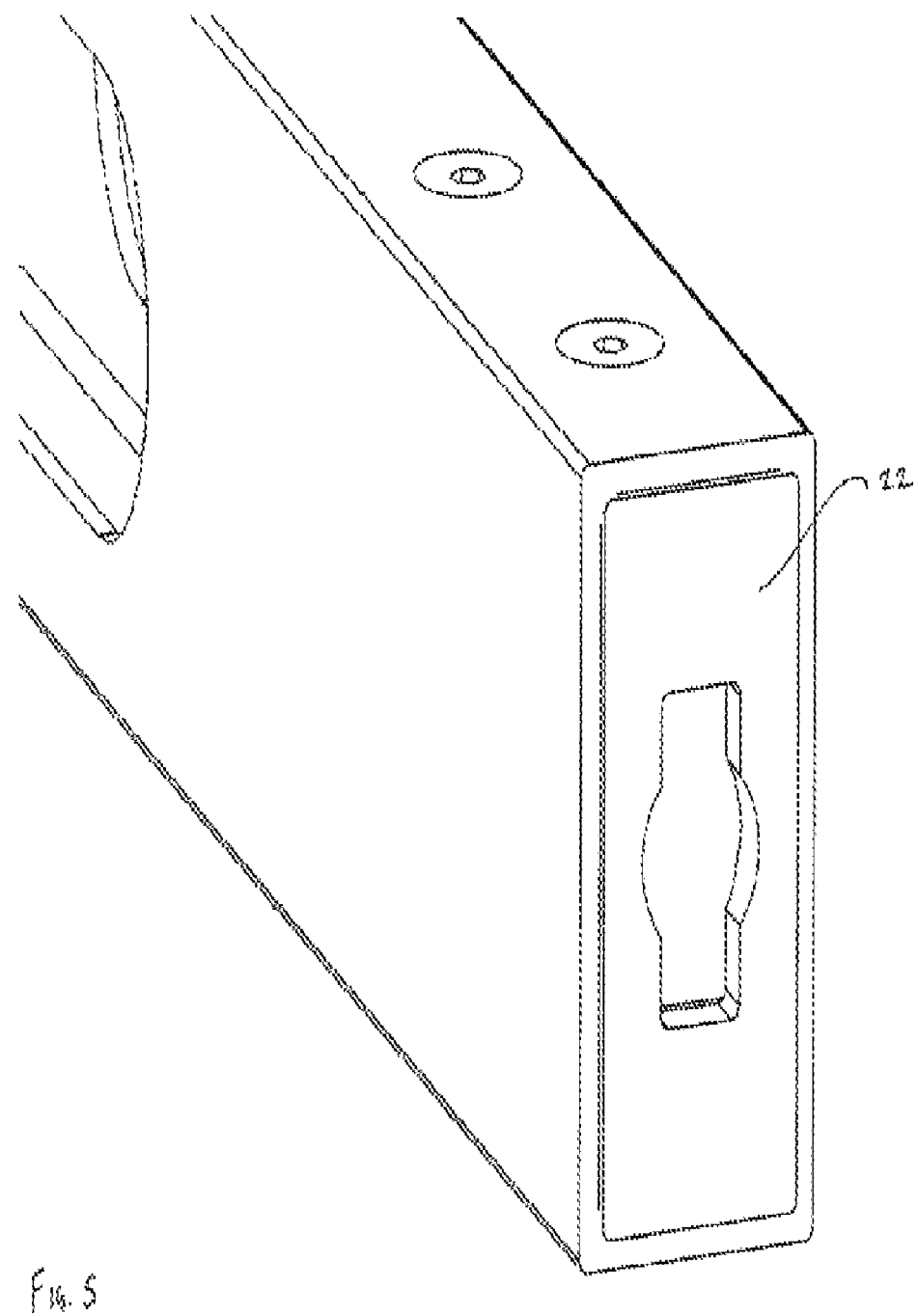
FIG. 5 shows a partial oblique view of a receiving end of a segment in accordance with this disclosure.

Referring now to FIG. 5, a more detailed view of a receiving end in accordance with this disclosure. A receiving end cap 22 is configured so that it can be mated to the extending coupling mechanism of an abutted section as shown in FIG. 6. The through hole in the receiving end cap 22 is shaped so as to receive the T-Head 18. The interior features of the receiving end cap 22 is configured such that the T-Head 18 in engaged and the spring 13 is compressed by the motion of the plunger shaft 16 mounted to the T-Head 18. Detent features of the receiving cap 22 corresponding to profile features of the T-Head 18 align the two abutted segment assemblies.

Referring back to FIG. 4, closing the handle 12 moves the coupled slider 15 so that it comes into contact with the end stop 14. The motion of the slider 15 is subsequently transmitted to the plunger shaft 16. Forces in the system allows the handle 12 to completely close in the manner of an over center clamping mechanism, creating a rigid stable connection between the abutted segments.

Opening the handle 12, causes the mechanism to release in a like manner so that segments can be separated. Once separated, closing the handle 12 causes the plunger shaft 16 and connected T-Head 18 to retract such that they do not protrude beyond the face of the extending coupling mechanism.

Figure 8:
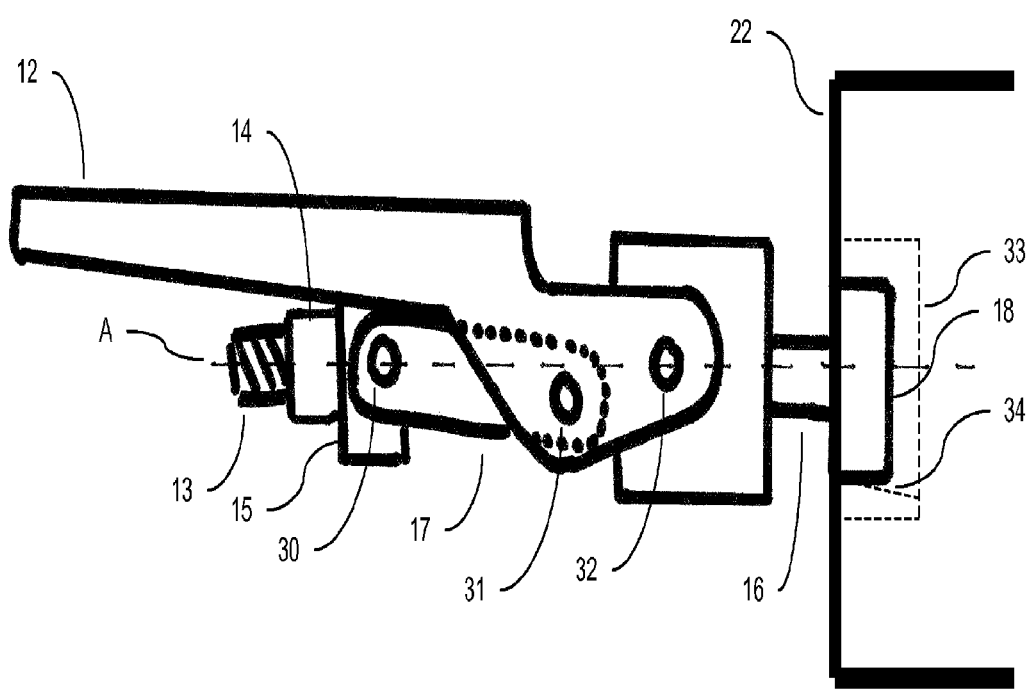
FIG. 8 is side cross-sectional view showing a more detailed view of the coupling mechanism in operation in accordance with this disclosure.

Referring now to FIG. 8, a side cross-sectional view of one embodiment the coupling mechanism is shown in a closed and locked position. When the handle 12 is closed, the slider 15 is stopped by the end cap 14 just prior to the pivot point 31 crossing over center of the axis A. As the handle 12 is further depressed, a tensional force will be created in the shaft 16 as pivot points 30 and 32 are forced apart. Simultaneously, a compressive force will be introduced into the links 17 as pivot point 31 nears axis A. After pivot point 31 passes over the center of axis A, the compressive and tensional forces will maintain the coupling mechanism in place in the arrangement shown in FIG. 8.

FIG. 8 also illustrates the end cap of member being coupled with the T-Head 18. As the units are rotated with respect to each other during the fastening process as illustrated in the sequence shown in FIG. 6, the T-Head 18 is rotated through a notched portion 34 of the end hole 33. This process will pull the T-Head 18 slightly further into the end hole 33, placing the spring 13 in moderate tension and effecting a pre-loading tension that will temporarily hold together and align the two segments being joined. This result in a much more sure and convenient joining process when compared to tools of the prior art.

As will now be appreciated, a new and novel tool for providing a useful edge reference for common construction tasks has been disclosed. This tool provides for a useful continuous reference edge over extended distances through adjoining segments. Each segment is suitably compact to be easy stowed. The segments are useful individually. The segments can be joined to extend tool to lengths useful in common construction tasks.

It is contemplated that alternate embodiments are possible that provide additional benefits. For example, the tool may provide for alternate section profiles, dimensions, or clamping means, and calibration means.

The tool may be configured to provide features for a variety of accessories, including but not limited to level inserts, handle inserts, clamp accessories, platforms for supporting other tools, end caps for segments, angle connections to couple segments, soft bumper accessories, saw guide features bracing supports, and alternative T-nut slot configurations.

While embodiments and applications of this invention have been shown and described, it will now be apparent to those skilled in the art having the benefit of this disclosure that many more modifications than mentioned above are possible without departing from the inventive concepts disclosed herein.

We claim:

1. A modular edge reference tool comprising:
    a first segment defining a longitudinal axis and a reference edge and having an extending end;
    a second segment defining a longitudinal axis and a reference edge and having a receptacle end;
    a coupling mechanism that couples the extending end and the first segment to the receptacle end of the second segment in a first and second stage that includes:
        a first component mounted within the extending end of the first segment that includes:
            a shaft slidably mounted to the extending end of the first segment with extended and retracted positions that includes an external geometry that extends from the extending end in the extended position;
            a compression spring that is coupled to the shaft with one end that is substantially fixed to the shaft and a second end that moves relative to the shaft;
            a handle coupled to the second end of the spring with a first position that arranges the second end of the spring to extend the shaft and a second position that arranges the second end of the spring to retract the shaft;
        a second component mounted within the receptacle end of the second segment that defines a hole, wherein the hole includes an entrance geometry that allows the hole to receive the extended external geometry of the shaft when the second segment is offset along the longitudinal axis from the first segment, wherein the hole includes internal geometry that subsequently engages the external geometry of the shaft and moves the shaft deeper into the hole upon a rotation of the second segment relative to the first segment to substantially hold the shaft in the extended position
    wherein the first end of the spring moves with the shaft closer to the second end of the spring as the shaft moves deeper into the hole upon the rotation of the second segment to provide a force of a first degree in the first stage to couple the first segment to the second segment; and
    wherein the transition of the handle from the first position to the second position moves the second end of the spring farther towards the first end of the spring to provide a force of a second degree higher than the first degree in the second stage to couple the first segment to the second segment.

2. The modular edge reference tool of claim 1, wherein the shaft includes a spring interface that is substantially fixed to the shaft that pushes the first end of the spring to move with the shaft.

3. The modular edge reference tool of claim 1, wherein the handle is coupled to a slider that is slidably engaged to the shaft, wherein the transition of the handle from the second to the first position moves the slider to push the second end of the spring to move with the slider.

4. The modular edge reference tool of claim 3, wherein the shaft and the slider include interfacing geometry wherein the shaft moves with the slider with the transition of the handle from the first position to the second position.

5. The modular edge reference tool of claim 1, wherein the entrance geometry is of a substantially identical shape as a cross section of the external geometry on the shaft when rotated to the offset of the second segment relative to the first segment.

6. The modular edge reference tool of claim 5, wherein the internal geometry of the hole includes a notch that engages the external geometry of the shaft to move the shaft deeper into the hole upon rotation of the second segment.

7. The modular edge reference tool of claim 1, wherein the shaft is substantially collinear to and positioned along the longitudinal axis of the first segment, and wherein the hole is substantially collinear to the longitudinal axis of the second segment, and wherein the engagement of the internal geometry and the external geometry substantially aligns the longitudinal axis of the first and second segments.

8. The modular edge reference tool of claim 1, further comprising a linkage that is coupled to the handle and the slider and wherein the linkage translates motion of the handle to move the slider.

9. The modular edge reference tool of claim 8, wherein the handle is a rotatable handle and wherein the linkage translates the rotational motion of the handle into the sliding motion of the slider.

10. The modular edge reference tool of claim 9, wherein the linkage, the slider, and the handle are arranged in an over center clamping mechanism in the second position of the handle.

11. The modular edge reference tool of claim 1, wherein the entrance geometry of the hole receives the extended external geometry of the shaft when the second segment is offset 90 degrees along the longitudinal axis from the first segment.

12. The modular edge reference tool of claim 1, wherein the internal geometry engages the external geometry of the shaft and moves the shaft into the hole upon a rotation of the second segment that substantially removes the offset of the second segment relative to the first segment.

13. The modular reference tool of claim 1, wherein the coupled first and second segments cooperate to form a substantially continuous reference edge.

14. The modular reference tool of claim 1, wherein the first segment includes a main face that includes receiving geometry for accessories.

15. A method for a two stage engagement of segments of a modular edge reference tool comprising:
providing a first segment defining a longitudinal axis with an extending end;
providing a second segment defining a longitudinal axis with a receptacle end;
providing a coupling mechanism with a first component mounted substantially within the extending end of the first segment that includes an external geometry that extends from the extending end of the first segment and a spring that provides a bias to retract the external geometry and a second component mounted substantially within the receptacle end of the second segment that includes an entrance geometry that receives the extending first component and an internal geometry that engages the external geometry of the first component;
offsetting the second segment along the longitudinal axis from the first segment;
extending the external geometry of the first component and inserting the extended first component into the receptacle end of the second component;
rotating the second segment and allowing the external geometry of the first component and the internal geometry of the second component to engage and substantially align the first and second segments and to pull the external geometry farther into the receptacle end of the second segment to engage the spring to provide a first force in the first stage to couple the first and second segments;
further engaging the spring to provide a second force higher than the first force in the second stage to couple the first and second segments.

16. The method of claim 15, wherein the spring is a compression spring and wherein the step of engaging the spring to provide a first force includes holding a first end of the spring substantially stationary while bringing the second end closer to the first end and wherein the step of engaging the spring to provide a second force includes holding the second end substantially stationary while bringing the first end closer to the second end.

17. The method of claim 16, wherein the step of holding the second end substantially stationary includes holding the second end substantially stationary at the location resulting from the step of bringing the second end closer to the first end.

18. The method of claim 15, further comprising providing a handle with a first position that extends the external geometry and a second position that engages the spring to provide the second force to couple the first and second segments.

19. The method of claim 15, wherein offsetting the second component relative to the first segment includes offsetting the second segment 90 degrees along the longitudinal axis from the first segment.

20. The method of claim 15, wherein the steps of rotating the second segment and allowing the external geometry of the first component and the internal geometry of the second component to engage includes rotating the second segment to substantially remove the offset of the second segment relative to the first segment.

* * * * *